Figure 1:
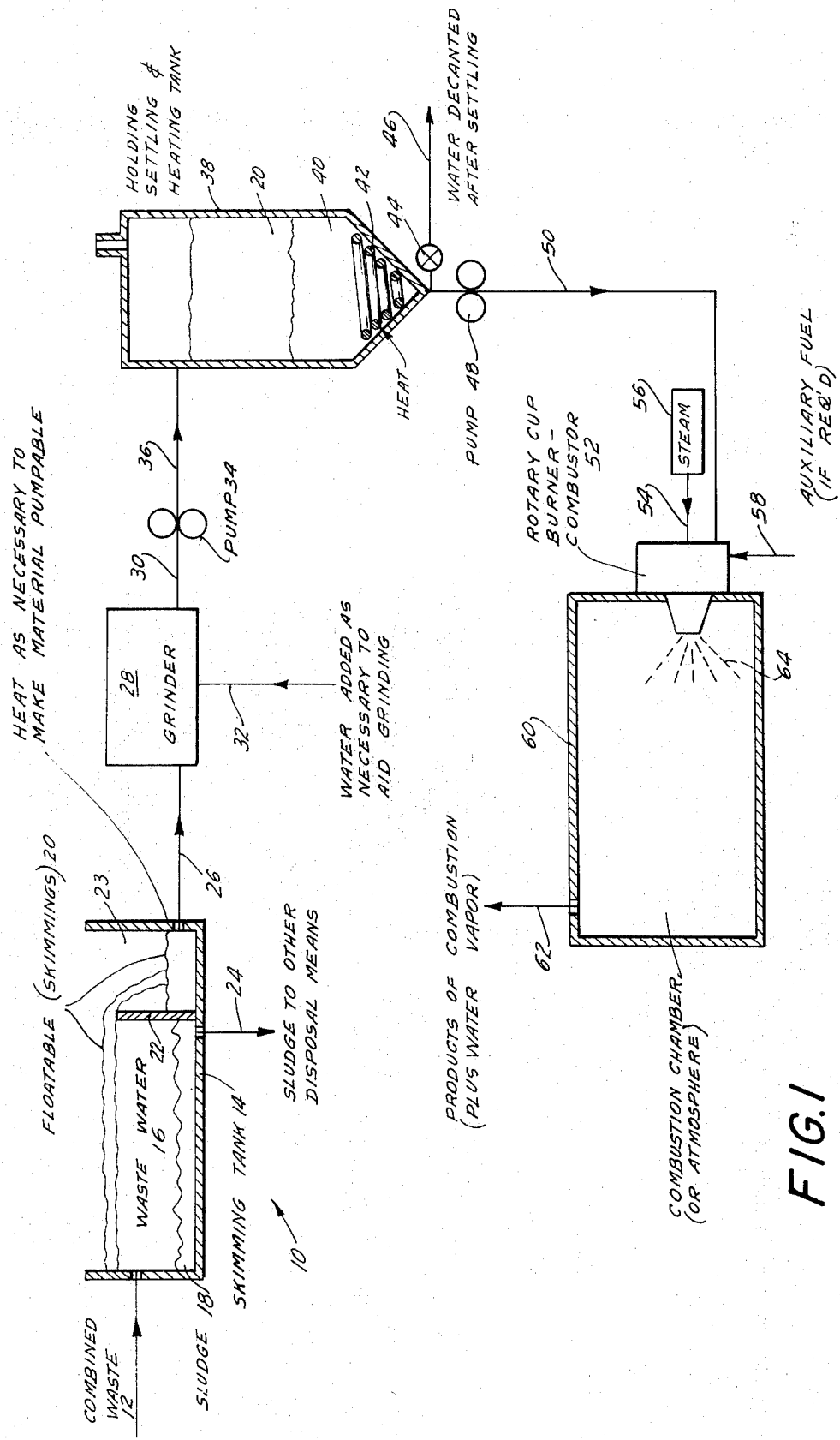

United States Patent [19]
DeAngelis

[11] 3,766,867

[45] Oct. 23, 1973

[54] BURNING APPARATUS AND METHOD

[75] Inventor: George G. DeAngelis, Ridgefield, Conn.

[73] Assignee: Preferred Utilities Manufacturing Corporation, Danbury, Conn.

[22] Filed: Dec. 27, 1971

[21] Appl. No.: 212,285

[52] U.S. Cl. .................................. 110/8 R, 110/7 S
[51] Int. Cl. ............................................. F23g 7/00
[58] Field of Search .................... 110/7 R, 7 S, 8 R, 110/53; 431/163

[56] References Cited
UNITED STATES PATENTS

| | | | |
|---|---|---|---|
| 2,537,467 | 1/1951 | Komline | 110/8 |
| 3,671,209 | 6/1972 | Teichmann et al. | 110/8 |
| 2,931,324 | 4/1960 | Wallis et al. | 431/163 |
| 3,659,786 | 5/1972 | Vier et al. | 110/7 |
| 3,357,375 | 12/1967 | Brophy | 110/7 |
| 1,841,831 | 1/1932 | Marston | 431/163 |

Primary Examiner—Kenneth W. Sprague
Attorney—Gregor N. Neff

[57] ABSTRACT

The burning apparatus and method are specially suited for burning comminuted solids contained in a liquid slurry, and are particularly useful in the burning of floatable wastes known as "skimmings." The skimmings are removed from the surface of a liquid in a skimming tank for sewage or other wastes. The skimmings are then sent through a grinder to grind up the solid floatable wastes, and mixed with water, if necessary. The resulting slurry is pumped to a holding and settling tank, where the water and floatables are allowed to separate from one another. The water is decanted off, and the skimmings are heated and delivered to a rotary-cup type burner with enlarged liquid flow passages. Steam is fed into the slurry before it is atomized, and the atomization product is ignited and burned. Supplementary fuel can be added to the slurry-steam mixture, if necessary. Preferably, a combustion chamber is used to help support combustion. After the chamber has been heated, the slurry can be burned without supplementary fuel.

15 Claims, 2 Drawing Figures

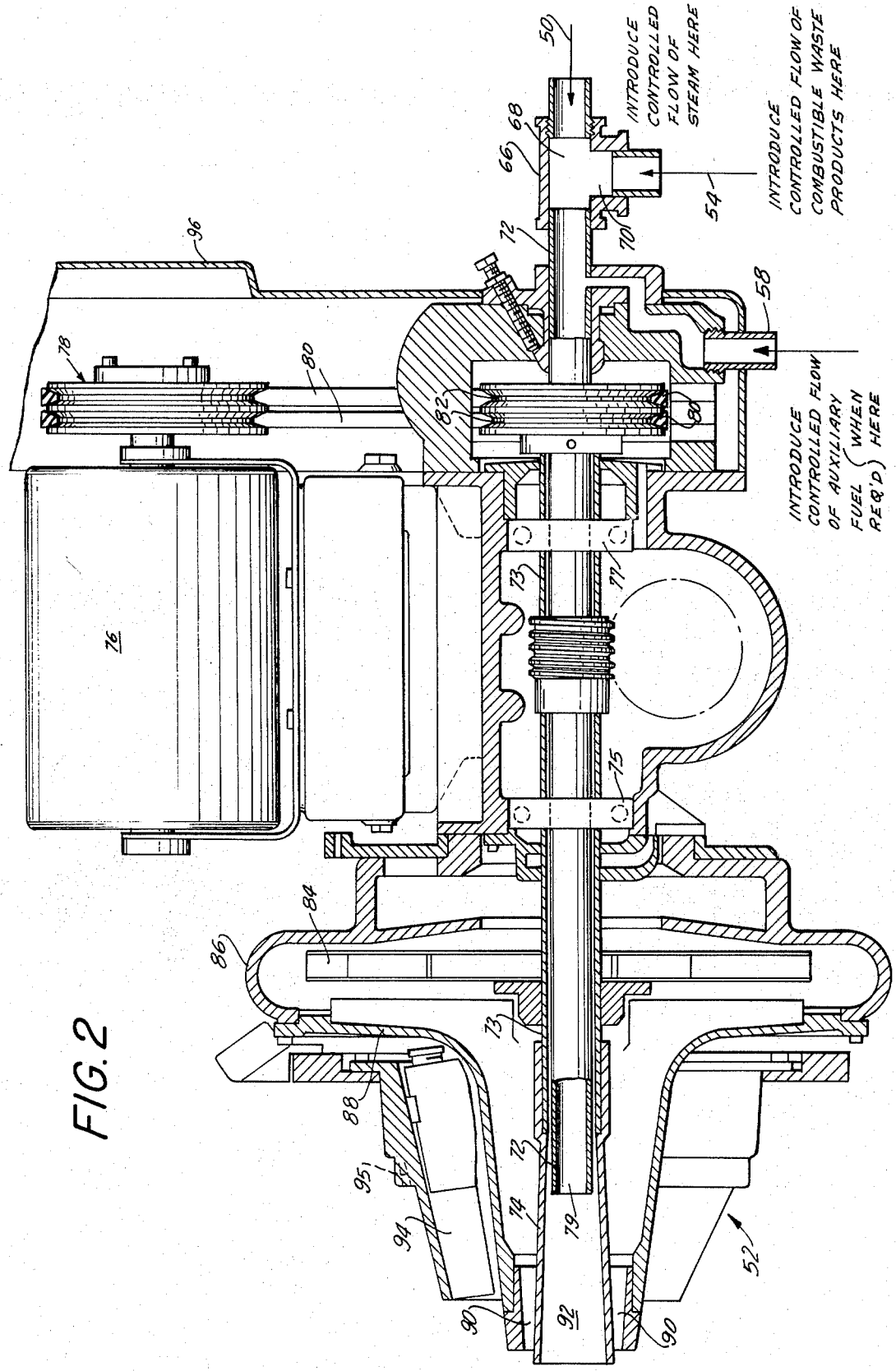

BURNING APPARATUS AND METHOD

This invention relates to burning apparatus and methods, and particularly to apparatus and methods for burning comminuted solids contained in a slurry. The apparatus and method are used to advantage to burn floatable wastes or "skimmings" which float on top of a tank of sewage or other liquid waste matter.

In the processing of sewage and other wastes, in the past it has been necessary to remove floating wastes from the surface of a tank of the waste liquid in order to ensure that the solid floating articles (e.g. wood, rubber, cooking fats, etc.) would not interfere with the further processing of the sewage. This creates the problem of how to dispose of the "skimmings" thus skimmed off the surface of the sewage.

Unfortunately, in the past, one method of disposal has been to simply dump the skimmings into our rivers or estuaries, thus causing pollution of those bodies of water. Another procedure, more enlightened but not fully satisfactory, has been to send the skimmings through a grinder to grind up the solid wastes, send the resulting slurry to a settling tank, remove some of the water, and then send the resulting materials to an incinerator for burning. However, this often does not result in proper burning of the skimmings, with the result that quantities of unburned floatable materials pile up in the incinerators and cause costly disposal problems of their own.

It is an object of the present invention to provide burning apparatus and method for the thorough combustion of solid combustibles in a liquid slurry. It is another major object of the invention to provide a method of burning floatable skimmings substantially thoroughly at a reasonable cost; in short, it is an object to provide apparatus and methods which overcome the disadvantages of the apparatus and methods previously available for disposing of skimmings.

In accordance with the present invention, the foregoing objects are met by the provision of an atomizing fuel burner into which the slurry is introduced together with a heated vapor. It is preferred that this vapor be steam. The resulting atomization products are ignited and burned. Preferably, they are burned in a combustion chamber. It also is preferred to provide a supplementary supply of liquid fuel such as fuel oil to mix with the steam and slurry prior to atomization. The burning can take place without supplemental fuel. Preferably, the slurry consists of skimmings and some water which has been heated substantially prior to being atomized.

The foregoing and other objects and advantages of the invention will be described in or apparent from the following description and drawings:

In the drawings:

FIG. 1 is a schematic flow diagram of a skimmings combustion disposal system constructed in accordance with the present invention and illustrating the method of the present invention; and FIG. 2 is a cross-sectional view of the burner used in the system shown in FIG. 1.

FIG. 1 shows a skimmings disposal system 10 in which a combination of liquid and solid waste materials flows through an inlet conduit 12 to a skimming tank 14. The waste material can come from the sewage system of a city, for example. In the skimming tank the solid wastes settle to the bottom to form sludge 18, and the floatable wastes 20 rise to the surface, leaving waste water 16 between the floating wastes and the sludge. The floatable materials 20 are separated from the waste water 16 by causing the surface liquid and floatables to flow over a weir 22 into a catch-basin 23. The sludge 18 is removed by means of a conduit 24 at the bottom of the skimming tank 14.

The skimmings are removed from the catch-basin 14 through a conduit 26 and are sent to a grinder 28 in which the floatable solids are ground ("comminuted") to a relatively small size so that they can be pumped through a conduit 30 by means of a pump 34 through a conduit 36 to a holding, settling and heating tank 38. A suitable grinder 28 is the "Mazerator" grinder sold by Robbins & Myers. Water is added to the grinder 28 through an inlet 32 when and if needed to aid in the grinding. The comminuted particles should be small enough to ensure that they will flow through the burner passages. The particles can be surprisingly large. For example, a 3/8 grinder has been used successfully to grind skimmings to a maximum size of three-eighths inch. The particles later flowed through a burner passage of ½ inch International Pipe Size (around 9/16 inch) minimum diameter. Thus, the particle size can be at least two-thirds of the minimum passage size without clogging.

The liquid is held in the tank 38 for as long as is necessary to allow the skimmings 20 to float to the surface and the water 40 to sink to the bottom of the tank. Heating coils 42 are provided within or on the surface of the tank for heating the liquids in the tank, preferably activated after separation of the floatable solids from the liquid. These coils can be electrical heating coils, steam tubes, etc. After the water 40 and the skimmings 20 have separated from one another, the water is decanted through a valve 44 and a conduit 46 at the bottom of the tank 38. The remaining skimmings and water mixture then is pumped by means of a pump 48 through a conduit 50 to a rotary-cup type burner 52. In addition, steam is supplied to the flow passageway for the skimmings through a conduit 54 from a source 56. Also, auxiliary fuel such as fuel oil can be supplied through an inlet conduit 58 to mix with the steam and skimmings slurry.

The burner 52 atomizes the skimmings-steam mixture. The resulting spray 64 is ignited in a combustion chamber 60. The solid skimming materials burn substantially completely and the products of combustion and water vapor escape from the combustion chamber through an outlet opening 62.

It has been found most desirable to heat the skimmings in the tank 38 to a temperature of approximately from 180° to 200° F. As noted above, water preferably is decanted from the tank 38 while the temperature of the materials is relatively low. This enhances separation of the skimmings and water.

The steam is believed to continuously purge and clean the atomizer and prevent it from clogging. As it will be described in greater detail below, special structural features of the burner further minimize the chances of clogging. Furthermore, it is believed that the steam aids in the combustion process. The amount and pressures at which the steam is supplied will vary considerably, depending upon the nature of the combustible substances being burned. The amount of steam used should be enough to keep the atomizer passages clean without adversely affecting the burning process. However, for skimmings, from one-half to one and one-half pounds of steam per gallon of combustible materials are believed to be satisfactory. Similarly, steam pressures of from 5 to 15 PSIG are believed to be satisfactory. Dry-saturated steam has been used successfully.

Pumps 34 and 48 are of the type called "progressing cavity" pumps, such as that sold under the trademark "Moyno" by Robbins & Myers. Such pumps are especially adapted to pumping liquids containing solid particles of substantial size.

FIG. 2 shows in substance the construction of the burner 52. The burner 52 is a rotary-cup burner sold by Preferred Utilities Manufacturing Corporation, Danbury, Conn., with several modifications.

The inlet conduit 50 includes a pipe tee 66 with an axial inlet opening 68 and a perpendicular opening 70. The pipe tee 66 is fastened to an inlet pipe 72 which extends through the center of a rotatable sleeve 73. The sleeve 73 is rotatably mounted in a pair of bearings 75 and 77. It is driven at a speed of 4,000 to 6,000 RPM by an electrical motor 76 driving a pair of sheaves 78 and V-belts 80 which drive a pair of sheaves 82 secured to the sleeve 73.

The stationary pipe 72 has an exit opening 79 within a frusto-conically shaped terminal portion of "cup" 74 located at the left hand side of FIG. 2. As is well known, the materials flowing through the pipe 72 and the outlet 79 are swirled rapidly in the cup 74 to form a thin film of liquid on the internal surface of the cup.

A fan impeller 84 is secured to the sleeve 73 and rotates in a housing 86. The impeller 84 pumps air through a passageway defined by a housing 88 to form a relatively high-speed annularly-shaped air stream exiting through an outlet 90 surrounding the outlet 92 and the cup 74. This air stream catches the film of liquid emerging from the cup and forms it into an atomized spray suitable for burning. Of course, the solid particles are not atomized but do burn if they are made of combustible material.

The structure is a modification of the normal rotary cup burner in that the usual distributing head and related structure has been left off of the open end 79 of the pipe 72 in order to minimize chances of clogging.

If it is desired to burn the atomized skimmings and steam in the open air, it often may be necessary to use a small amount of fuel, such as fuel oil supplied through the inlet 58 (FIGS. 1 and 2) into the pipe 72 to mix with the steam and skimming materials. Natural gas also can be used. It is introduced into the atomized mixture outside of the burner through holes 95 spaced around the burner. However, if a combustion chamber 60 is used, as soon as its temperature rises to at least 1,000°, and preferably to 1,300° or 1,400° F., it has been found that the usual skimmings will burn without the use of any additional fuel.

An igniter 94 is provided to ignite the atomizing mixture produced by the burner 52. It is conventional, and may be of the type which uses gas as fuel. The heated combustion chamber 60 aids in the ignition of the atomized skimmings and steam, and thus can be considered part of the ignition mechanism of the system.

The system and methods described above have numerous advantages. One advantage is that it provides for complete combustion of comminuted substances in a slurry, and makes it possible to obtain such complete combustion without the use of auxiliary fuel. The results of the invention are rather surprising in that atomizing burner equipment, which normally would clog at the slightest provocation when burning such large solid particles, is used to completely burn combustible solid particles mixed with liquids.

The above description of the invention is intended to be illustrative and not limiting. Various changes or modifications in the embodiments described can be made without departing from the spirit or scope of the invention.

I claim:

1. Apparatus for burning comminuted solids in a liquid slurry, said apparatus comprising means for introducing said slurry into an atomizing fuel burner with liquid flow passageways relatively larger than the size of the solid particles in said slurry, means for introducing steam into said passageways, and means for igniting the atomization product, said atomizing fuel burner including means for spinning a portion of the conduit containing the mixture of steam and slurry at a relatively high speed to form a thin fluid film on the inside of said conduit portion, and forming an air jet to mix with the mixture flowing out of said portion.

2. Apparatus as in claim 1 including a combustion chamber receiving the atomization product, and means for pre-heating said chamber.

3. Apparatus as in claim 1 including means for pre-heating said slurry, and in which said introducing means is a steam conduit.

4. Apparatus as in claim 1 for introducing a fluid fuel into said slurry.

5. A skimmings disposal system including means for comminuting solids in said skimmings, a settling container for separating water from said skimmings, means for heating said skimmings, a rotary cup atomizing burner with enlarged fluid flow passages, means for introducing steam into said skimmings, means for introducing a fluid fuel into said skimmings, and means for delivering the mixture of steam and skimmings, together with any fluid fuel used, into said burner.

6. A system as in claim 5 including a combustion chamber in which the burner output is burned.

7. A method of burning comminuted solids mixed with a liquid in a slurry, said method comprising the steps of atomizing said slurry, mixing steam with said slurry prior to atomization, and igniting the atomization product, said atomizing step consisting of spinning said mixture at a relatively high speed to form a thin liquid film on the inside of a fluid flow conduit and forming an air jet to mix with the mixture flowing out of said atomizer.

8. A method as in claim 7 including the steps of heating said slurry to a temperature of from 180° F. to 200° F. prior to atomization.

9. A method as in claim 7 including the step of discharging the atomization product into a combustion chamber, and pre-heating said chamber to a temperature of at least 1,000° F. ;rior to forcing said slurry through said atomizer.

10. A method of disposing of waste skimmings including solids, said method comprising the steps of grinding a mixture of said skimmings and water so as to comminute said solids, holding the resulting mixture in a container, separating a substantial portion of the water from said skimmings, mixing steam with said skimmings, atomizing the resulting mixture, and igniting the atomized mixture, said atomizing step consisting of spinning said mixture at a relatively high speed to form a thin liquid film on the inside of a fluid flow conduit and forming an air jet to mix with the mixture flowing out of said atomizer.

11. A method as in claim 10 including the step of adding a fluid fuel to said skimmings.

12. A method as in claim 10 including heating said skimmings to a temperature of approximately 180° F. to 200° F.

13. A method as in claim 10 including discharging the atomization product into a combustion chamber, heating said chamber to a temperature of at least 1,000° F. with the use of a fluid fuel in said atomizer, and continuing combustion without said fuel.

14. A method of disposing of waste skimmings including solids, said method comprising the steps of grinding a mixture of said skimmings and water so as to comminute said solids, holding the resulting mixture in a container, separating a substantial portion of the water from said skimmings, mixing steam with said skimmings at a rate of approximately one-half to one and one-half pounds of steam per gallon of skimmings, at from 5 to 15 P.S.I.G., atomizing the resulting mixture, and igniting the atomized mixture.

15. A method of disposing of waste skimmings including solids, said method comprising the steps of grinding a mixture of said skimmings and water so as to comminute said solids, holding the resulting mixture in a container, separating a substantial portion of the water from said skimmings, decanting said water from said container, heating said skimmings in said container to approximately 180° F. to 200° F., mixing steam with said skimmings, atomizing the resulting mixture, and igniting the atomized mixture.

* * * * *